(12) United States Patent
Bertollini et al.

(10) Patent No.: US 10,082,791 B2
(45) Date of Patent: Sep. 25, 2018

(54) AUTONOMOUS VEHICLE CONTROL SYSTEM AND METHOD

(71) Applicant: GM GLOBAL TECHNOLOGY OPERATIONS LLC, Detroit, MI (US)

(72) Inventors: Gary P. Bertollini, Lake Orion, MI (US); Joseph F. Szczerba, Grand Blanc, MI (US); Roy J. Mathieu, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 158 days.

(21) Appl. No.: 15/006,750

(22) Filed: Jan. 26, 2016

(65) Prior Publication Data

US 2017/0212515 A1     Jul. 27, 2017

(51) Int. Cl.
| | | |
|---|---|---|
| G01C 22/00 | (2006.01) | |
| G05D 1/00 | (2006.01) | |
| G05D 1/02 | (2006.01) | |
| B60Q 9/00 | (2006.01) | |
| B60W 30/00 | (2006.01) | |

(52) U.S. Cl.
CPC .............. G05D 1/021 (2013.01); B60Q 9/00 (2013.01); B60W 30/00 (2013.01); G05D 1/0276 (2013.01)

(58) Field of Classification Search
None
See application file for complete search history.

(56) References Cited

U.S. PATENT DOCUMENTS

| | | | | |
|---|---|---|---|---|
| 2007/0241595 A1* | 10/2007 | Nathan | ..................... | B06B 3/00 297/217.3 |
| 2008/0202282 A1* | 8/2008 | Bassett | .................... | B62D 1/06 74/552 |
| 2012/0283939 A1* | 11/2012 | Bobbitt, III | .......... | B60W 50/16 701/123 |
| 2012/0316455 A1* | 12/2012 | Rahman | ............... | G01C 22/006 600/547 |
| 2012/0316456 A1* | 12/2012 | Rahman | ................. | G06F 1/163 600/547 |
| 2013/0141576 A1* | 6/2013 | Lord | ........................ | G08G 1/04 348/148 |
| 2014/0088814 A1* | 3/2014 | You | ...................... | G05D 1/0061 701/23 |
| 2014/0111324 A1* | 4/2014 | Lisseman | ............... | B62D 1/046 340/435 |
| 2014/0156133 A1* | 6/2014 | Cullinane | ............. | B60W 30/00 701/23 |
| 2014/0303827 A1* | 10/2014 | Dolgov | ................ | B60W 30/00 701/23 |

(Continued)

*Primary Examiner* — Bhavesh V Amin
(74) *Attorney, Agent, or Firm* — Quinn IP Law

(57) ABSTRACT

A vehicle including an autonomic vehicle control system is described. A method for operating the vehicle includes, during operation of the autonomic vehicle control system, determining vehicle and environmental operating conditions and extra-vehicle conditions when the autonomic vehicle control system is activated. A confidence level associated with operation of the autonomic vehicle control system is determined based upon the vehicle operating conditions, the environmental operating conditions and the extra-vehicle conditions. The confidence level associated with the operation of the autonomic vehicle control system is transmitted via an operator interface device.

16 Claims, 3 Drawing Sheets

(56) References Cited

U.S. PATENT DOCUMENTS

| | | | |
|---|---|---|---|
| 2015/0016093 A1* | 1/2015 | Wilson | A41D 19/0024 362/103 |
| 2015/0178998 A1* | 6/2015 | Attard | G07C 5/008 701/23 |
| 2015/0199955 A1* | 7/2015 | Draganic | G10K 15/02 381/86 |
| 2015/0314681 A1* | 11/2015 | Riley, Sr. | B60W 50/16 340/576 |
| 2015/0329121 A1* | 11/2015 | Lim | H04W 4/027 701/36 |
| 2016/0028824 A1* | 1/2016 | Stenneth | B60Q 9/008 709/219 |
| 2016/0066127 A1* | 3/2016 | Choi | H04W 4/008 455/41.2 |
| 2016/0117928 A1* | 4/2016 | Hodges | G07C 5/008 701/99 |
| 2016/0133117 A1* | 5/2016 | Geller | A61B 5/6803 340/457 |
| 2017/0021762 A1* | 1/2017 | Daman | B60Q 9/00 |

* cited by examiner

AUTONOMOUS VEHICLE CONTROL SYSTEM AND METHOD

TECHNICAL FIELD

The disclosure relates to control and operation of autonomous driving systems and semi-autonomous driving systems.

BACKGROUND

Autonomous driving systems and semi-autonomous driving systems employ inputs that characterize road surface and pathway, other vehicles, and driving conditions to automatically control operations of an internal combustion engine and/or another driveline torque generator, a braking system and/or a steering mechanism to control vehicle operation. Operation of autonomic vehicle control systems may be in the form of either an enabled state or a disabled state that is determined in response to an operator command or request.

SUMMARY

A vehicle including an autonomic vehicle control system is described. A method for operating the vehicle includes, during operation of the autonomous vehicle control system, determining vehicle and environmental operating conditions and extra-vehicle conditions when the autonomic vehicle control system is activated. A confidence level associated with operation of the autonomic vehicle control system is determined based upon the vehicle operating conditions, the environmental operating conditions and the extra-vehicle conditions. The confidence level associated with the operation of the autonomic vehicle control system is transmitted via an operator interface device.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
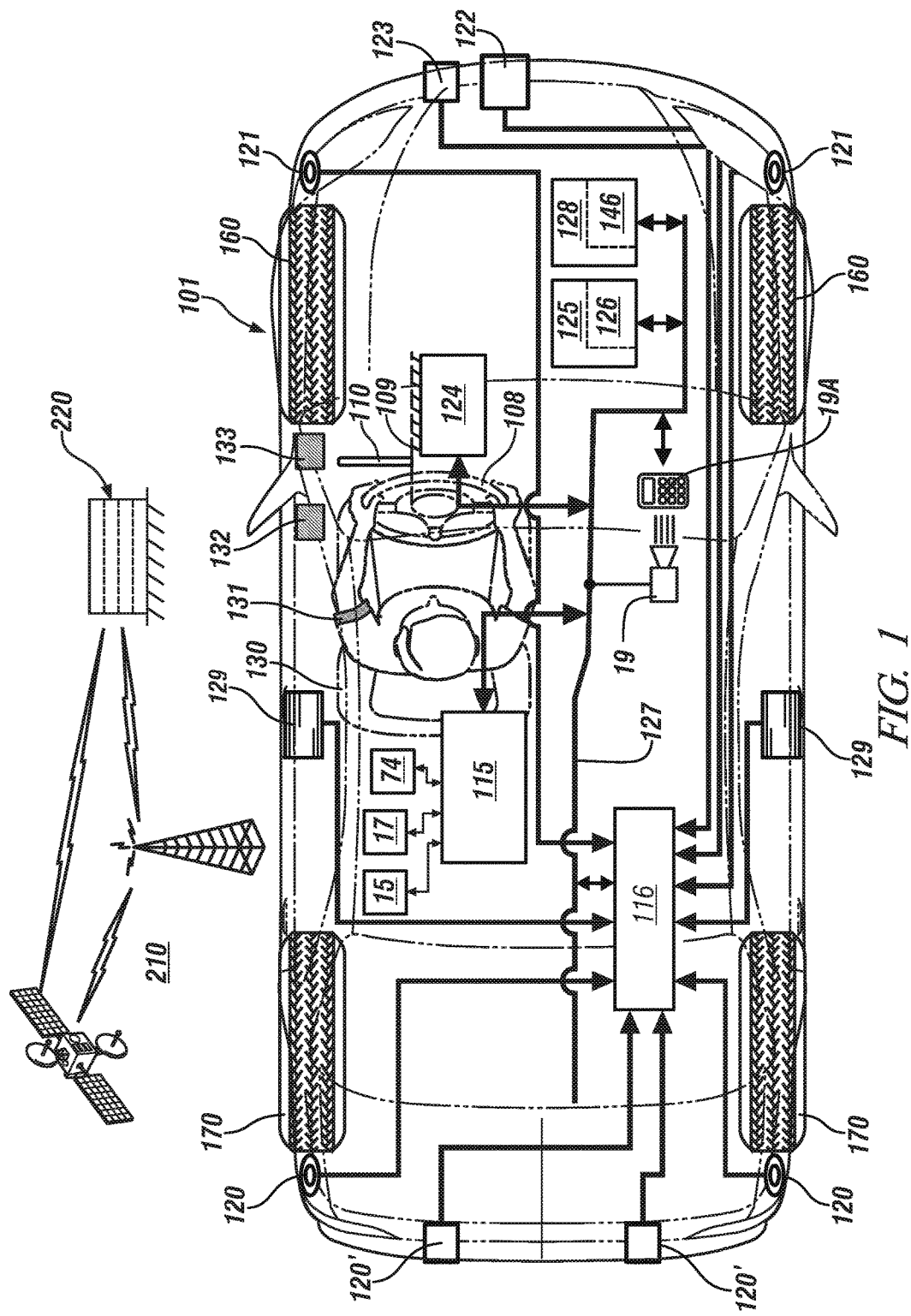
FIG. 1 is a schematic plan view of a subject vehicle including an extra-vehicle monitoring system and an autonomic vehicle control system, in accordance with the disclosure.

Referring now to the drawings, wherein the showings are for the purpose of illustrating certain exemplary embodiments only and not for the purpose of limiting the same, FIG. 1 schematically shows a subject vehicle 101 employing one or a plurality of autonomic vehicle control systems that is illustrative of the concepts described herein. The subject vehicle 101 includes a four-wheel passenger vehicle with steerable front wheels 160 and fixed rear wheels 170. The subject vehicle 101 may include, by way of non-limiting examples, a passenger vehicle, a light-duty or heavy-duty truck, a utility vehicle, an agricultural vehicle, an industrial/warehouse vehicle, or a recreational off-road vehicle. The subject vehicle 101 preferably includes a spatial monitoring system 116, a vehicle monitoring system 115, and a communication controller 19. Operation of the subject vehicle 101 may be controlled by a powertrain control module (PCM) 125, a vehicle control module (VCM) 128, and other suitable controllers.

The subject vehicle 101 preferably includes one or a plurality of autonomic vehicle control systems, including, e.g., an adaptive cruise control system (ACC) 126, a lane guidance and lane keeping system, a lane change system, a steering assist system, an object avoidance system, and a parking assistance system, among others. By way of example, the PCM 125 includes the ACC 126 for controlling vehicle braking and acceleration to control vehicle speed and acceleration, including autonomous control of vehicle braking and acceleration to control vehicle speed and acceleration under predetermined conditions. The VCM 128 includes steering controller (STRG) 146 for controlling vehicle lateral motion control, e.g., as part of a lane guidance, lane keeping or lane change system. The spatial monitoring system 116, vehicle monitoring system 115, PCM 125, VCM 128, and communication controller 19 preferably communicate therebetween using a high-speed local area network communication bus 127. The spatial monitoring system 116, vehicle monitoring system 115, PCM 125, and VCM 128 of the subject vehicle 101 are shown as discrete elements for ease of description. It should be appreciated that the functions described and performed by the discrete elements may be executed using one or more devices that may include algorithmic code, predetermined calibrations, hardware, application-specific integrated circuitry (ASIC), and/or off-board or cloud-based computing systems.

The spatial monitoring system 116 includes a controller that communicates with sensing devices to monitor and generate digital images representing remote objects proximate to the subject vehicle 101. A remote object is said to be proximate to the subject vehicle 101 when the remote object can be detected by one or more of the sensing devices. The spatial monitoring system 116 preferably determines a linear range, relative speed, and trajectory of each proximate remote object and communicates such information using the communication controller 19. The sensing devices are situated on the subject vehicle 101, and include front corner sensors 121, rear corner sensors 120, rear side sensors 120', side sensors 129, and front radar sensor 122, and a camera 123 in one embodiment, although the disclosure is not so limited. Preferably the camera 123 includes a monochrome vision camera used for detecting forward lane markings. The front radar sensor 122 preferably includes a long-range radar device for object detection in front of the subject vehicle 101. The front radar sensor 122 preferably detects objects at a distance up to 200 m with a narrow field of view angle of around 15° in one embodiment. Due to the narrow field of view angle, the long range radar may not detect all objects in the front of the subject vehicle 101. The front corner sensors 121 preferably include short-range radar devices to assist in monitoring the region in front of the subject vehicle 101, each having a 60° field of view angle and 40 m detection range in one embodiment. The side sensors 129, rear corner sensors 120 and rear side sensors 120' preferably include short-range radar devices to assist in monitoring oncoming traffic beside and behind the subject vehicle 101, each having a 60° field of view angle and 40 m detection range in one embodiment. Placement of the aforementioned sensors permits the spatial monitoring system 116 to monitor traffic flow including proximate object vehicles and other objects around the subject vehicle 101. Data generated by the spatial monitoring system 116 may be employed by lane mark detection processor 74 to estimate the roadway.

Alternatively, the sensing devices can include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other known camera/video image processors which utilize digital photographic methods to 'view' forward objects including one or more object vehicle(s). Such sensing systems are employed for detecting and locating objects in automotive applications and are useable with systems including adaptive cruise control, collision avoidance, pre-crash safety, and side-object detection.

The sensing devices are preferably positioned within the subject vehicle 101 in relatively unobstructed positions. It is also appreciated that each of these sensors provides an estimate of actual location or condition of an object, wherein said estimate includes an estimated position and standard deviation. As such, sensory detection and measurement of object locations and conditions are typically referred to as 'estimates.' It is further appreciated that the characteristics of these sensors are complementary, in that some are more reliable in estimating certain parameters than others. Sensors can have different operating ranges and angular coverages capable of estimating different parameters within their operating ranges. For example, radar sensors can usually estimate range, range rate and azimuth location of an object, but are not normally robust in estimating the extent of a detected object. A camera with vision processor is more robust in estimating a shape and azimuth position of the object, but is less efficient at estimating the range and range rate of an object. Scanning type lidar sensors perform efficiently and accurately with respect to estimating range, and azimuth position, but typically cannot estimate range rate, and are therefore not as accurate with respect to new object acquisition/recognition. Ultrasonic sensors are capable of estimating range but are generally incapable of estimating or computing range rate and azimuth position. Further, it is appreciated that the performance of each sensor technology is affected by differing environmental conditions. Thus, some sensors present parametric variances during operation, although overlapping coverage areas of the sensors create opportunities for sensor data fusion.

The vehicle monitoring system 115 preferably includes a plurality of on-board chassis monitoring sensing systems and devices for monitoring vehicle operation to determine vehicle motion states that are communicated to the communication bus 127. The vehicle motion states preferably include, e.g., vehicle speed, steering angle of the steerable front wheels 160, and yaw rate. The on-board chassis monitoring sensing systems and devices include inertial sensors, such as rate gyros and accelerometers. The vehicle monitoring system 115 estimates the vehicle motion states, such as longitudinal speed, yaw-rate and lateral speed, and estimates lateral offset and heading angle of the subject vehicle 101. The measured yaw rate is combined with steering angle measurements to estimate the vehicle state of lateral speed. The longitudinal speed may be determined based upon signal inputs from wheel speed sensors arranged to monitor each of the front wheels 160 and rear wheels 170. The vehicle monitoring system 115 generates signals associated with the vehicle motion states that can be monitored by other vehicle control systems for vehicle control and operation. On-board chassis monitoring sensing systems and devices for monitoring vehicle operation to determine vehicle motion states are known to those having ordinary skill in the art.

The PCM 125 communicates with and is operatively connected to a vehicle powertrain (not shown), and executes control routines to control operation of an engine, a transmission and other torque machines, none of which are shown, to transmit tractive torque to the vehicle wheels in response to vehicle operating conditions and operator inputs. The PCM 125 is shown as a single control module, but can include a plurality of controller devices operative to control various powertrain actuators, including the engine, transmission, torque machines, wheel motors, and other elements of a hybrid powertrain system, none of which are shown. The PCM 125 may include control routines in the form of algorithmic code to operate the adaptive cruise control system (ACC) 126 that controls vehicle braking and acceleration in response to operator control inputs that are detected using a human-machine interface (HMI) controller 124, including autonomous control of vehicle braking and acceleration to control vehicle speed and acceleration under predetermined conditions. On-board powertrain control systems and devices are known to those having ordinary skill in the art.

The VCM 128 communicates with and is operatively connected to a plurality of vehicle operating systems and executes control routines to control operation thereof. The vehicle operating systems preferably include braking, stability control, and steering systems. The vehicle operating systems can also include other systems, e.g., HVAC, entertainment systems, communication systems, and anti-theft systems. The VCM 128 is shown as a single control module, but can include a plurality of controller devices operative to monitor systems and control various vehicle actuators. The VCM 128 includes the steering controller (STRG) 146 for vehicle lateral motion control. The steering controller 146 preferably includes an electrical power steering system (EPS) coupled with an active front steering system to augment or supplant operator input through a steering wheel 108 by controlling steering angle of the steerable wheels 160 during execution of an autonomic maneuver such as a lane change maneuver. An exemplary active front steering system permits primary steering operation by the vehicle operator including augmenting steering wheel angle control when necessary to achieve a preferred steering angle and/or vehicle yaw angle. It is appreciated that the control methods described herein are applicable with modifications to vehicle steering control systems such as electrical power steering, four/rear wheel steering systems, and direct yaw control systems that control traction of each wheel to generate a yaw motion.

The passenger compartment of the subject vehicle 101 allows a vehicle operator to interact with the steering wheel 108, which is mounted on a steering column 109. An input device 110 may be mechanically mounted on the steering column 109 and may communicate with the HMI controller 124. Alternatively, the input device 110 can be mechanically mounted proximate to the steering column 109 in a location that is convenient to the vehicle operator. The input device 110, shown herein as a stalk projecting from column 109, includes an interface device by which the vehicle operator may command vehicle operation in an autonomic control mode, e.g., by commanding activation of one or more of the autonomic vehicle control systems. The mechanization of the input device 110 is illustrative. One of ordinary skill in the art understands that the input device 110 may be mechanized in any one or more of a plurality of devices, or may be in the form of a controller that is voice-activated, or may be any other suitable system. The input device 110 preferably has control features and a location that is used by present turn-signal activation systems. Alternatively, other input devices, such as levers, switches, buttons, and voice recognition input devices can be used in place of or in addition to the input device 110.

The HMI controller 124 monitors operator requests and provides information to the operator including status of vehicle systems, service and maintenance information. The HMI controller 124 communicates with and/or controls operation of a plurality of operator interface devices, wherein the operator interface devices are capable of transmitting a message associated with operation of one of the autonomic vehicle control systems, including a message urging operator action. The HMI controller 124 preferably also communicates with one or more devices that monitor biometric data associated with the vehicle operator, including, e.g., eye gaze location, posture, and head position tracking, among others. Such biometric monitoring devices and systems are known to those skilled in the art. The HMI controller 124 is depicted as a unitary device for ease of description, but may be configured as a plurality of controllers and associated sensing devices in an embodiment of the system described herein.

The HMI controller 124 communicates with the communication bus 127, and thus communicates with other controllers in the subject vehicle 101. The HMI controller 124 is configured to monitor a signal output from the input device 110, detect an activation signal from the vehicle operator based upon the signal output from the input device 110, and communicate the activation signal to the communication bus 127. The HMI controller 124 is configured to monitor operator inputs to the steering wheel 108, an accelerator pedal and a brake pedal, among other operator inputs. Operator interface devices that are capable of transmitting a message urging operator action can include an electronic visual display module, e.g., a liquid crystal display (LCD) device 133, a heads-up display (HUD) (not shown), an audio feedback device 132, a wearable device 131 and a haptic seat 130. The operator interface devices that are capable of urging operator action are preferably controlled by or through the HMI controller 124.

Figure 2:
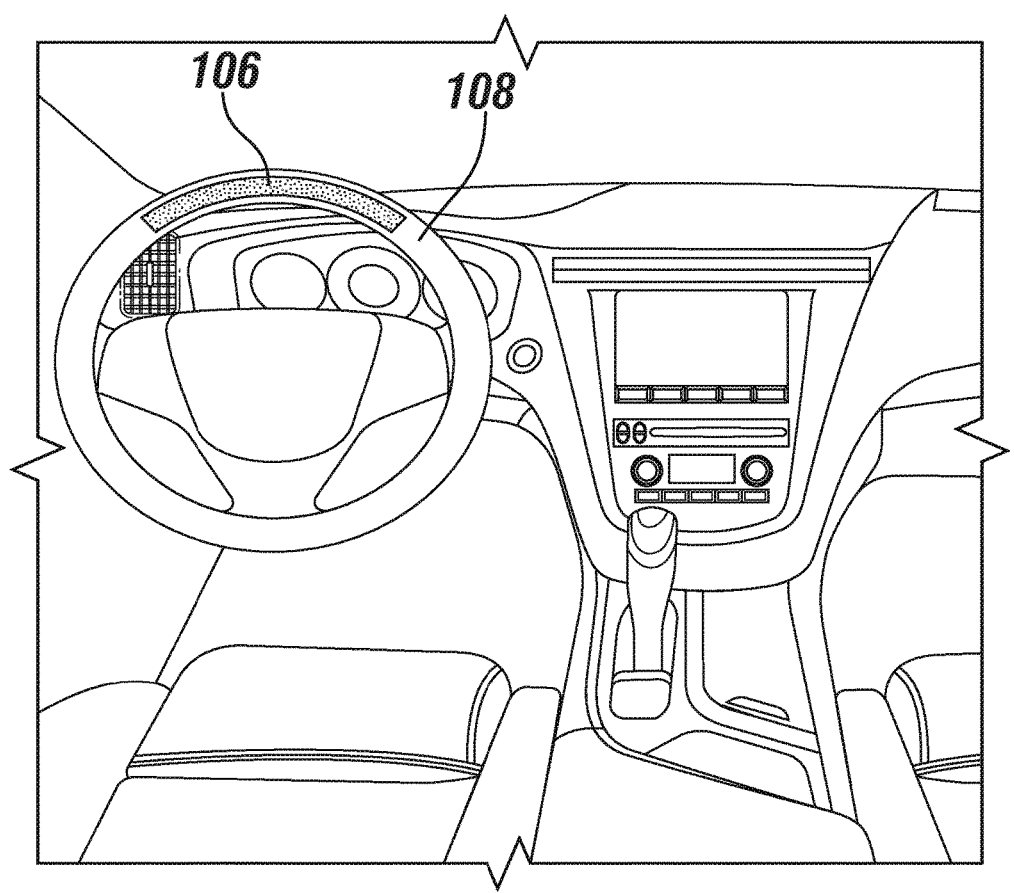
FIG. 2 shows a schematic view of a portion of a vehicle interior, including an operator's side view of the vehicle interior, in accordance with the disclosure.

FIG. 2 schematically shows a portion of a vehicle interior including an embodiment of the steering wheel 108, wherein the steering wheel includes a visual display in the form of a controllable multi-color light bar 106. In one embodiment the multi-color light bar 106 may have controllable illumination capability that includes adjusting one or more of color, color intensity, bar length, and animation such as moving or pulsing. The multi-color light bar 106 may be located elsewhere within the field of view of the operator.

The other operator interface devices may operate as follows. The HUD may project information that is reflected onto an interior side of a windshield of the vehicle, in the field of view of the operator, including transmitting a confidence level associated with operation of one of the autonomic vehicle control systems. The HUD may also provide augmented reality information, such as lane location, vehicle path, directional and/or navigational information, and the like. HUD and related systems are known to those skilled in the art. The haptic seat 130 may include vibration capabilities that vary in frequency, velocity, modulation, and or intensity. The audio feedback device 132 may include sound capability that varies in frequency, velocity, modulation, and/or intensity. The wearable device 131 may include vibration capabilities that vary in frequency, velocity, modulation, and or intensity.

The subject vehicle 101 includes a communication controller 19 that has a wireless telematics communication system capable of extra-vehicle communications, including communicating with a communication network system 210 having wireless and wired communication capabilities. The communication controller 19 may include a wireless telematics communication system capable of extra-vehicle communications that includes short-range vehicle-to-vehicle (V2V) communication. Alternatively or in addition, the communication controller 19 has a wireless telematics communication system capable of short-range wireless communication to a handheld device 19A, e.g., a cell phone, a satellite phone or another telephonic device. In one embodiment the handheld device 19A is loaded with a software application that includes a wireless protocol to communicate with the communication controller 19, and the handheld device 19A executes the extra-vehicle communication, including communicating with a remote server 220 via a communication network 210. The subject vehicle 101 may also include a global positioning system 15 and a navigation system 17, which may be employed to define a geographic location of the subject vehicle 101.

In one embodiment there is an intelligent highway system that is configured to monitor locations, speeds and trajectories of a plurality of vehicles. In one embodiment, the subject vehicle 101 is configured to communicate with the communication network 210, including communicating between the intelligent highway system and the subject vehicle 101. This can include communicating geographic location, forward velocity and acceleration rate of one or more vehicles in relation to the subject vehicle 101. In one embodiment, the subject vehicle 101 is configured to communicate with the remote server 220 via the communication network 210.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, e.g., high-speed local area network communication bus 127, a wireless link or any other suitable communication link. Communication includes exchanging data signals in any suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term 'signal' refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

As used in this specification and claims, the terms 'for example,' 'for instance,' 'such as,' and 'like,' and the verbs 'comprising,' 'having,' 'including,' and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

Figure 3:
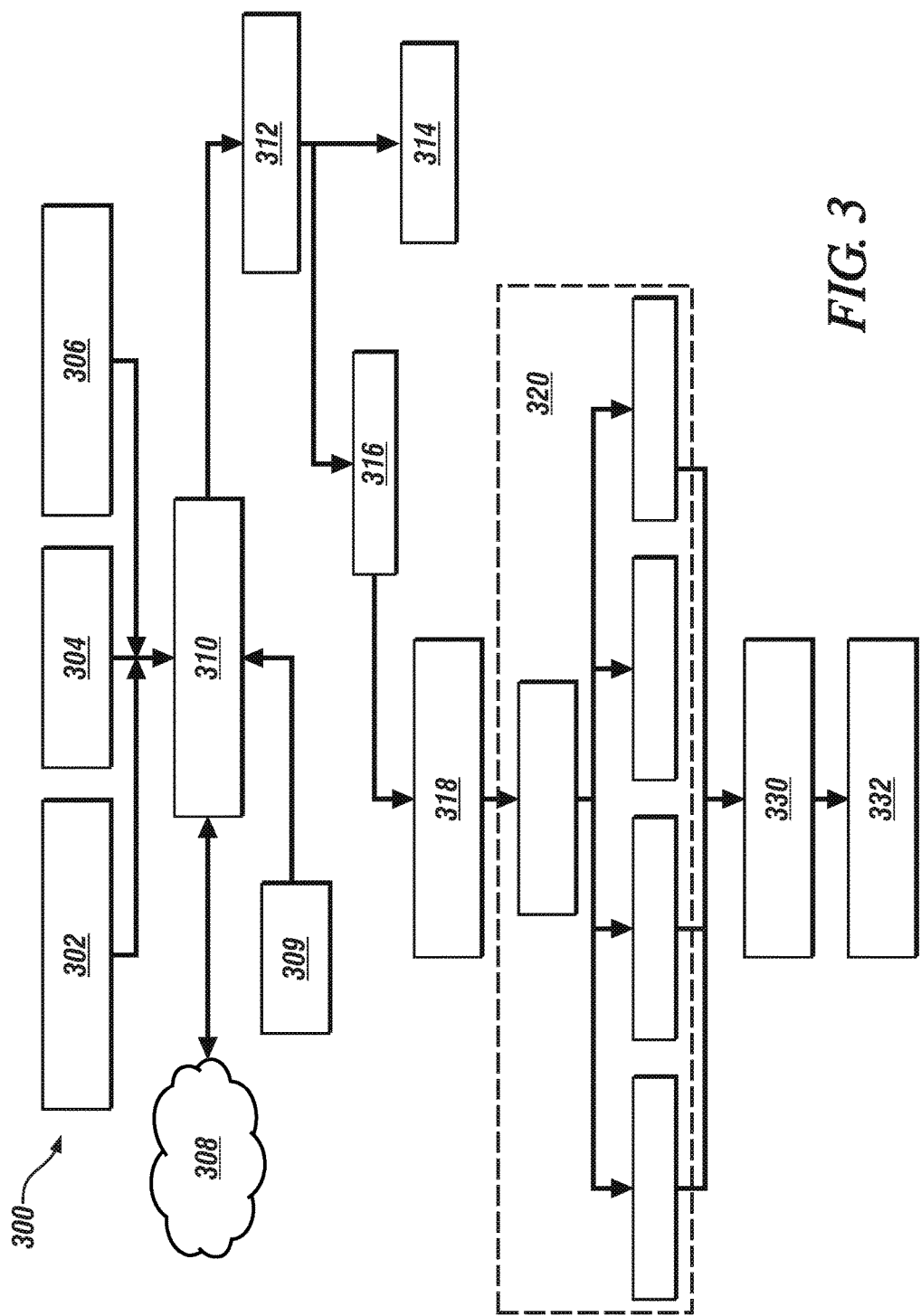
FIG. 3 shows a flowchart that depicts a method for determining and communicating a confidence level associated with the operation of the autonomous vehicle control system via an operator-discernible device, in accordance with the disclosure.

FIG. 3 schematically shows a process 300 to determine and communicate a metric associated with operation of an autonomic vehicle control system for an embodiment of the subject vehicle 101 that is described with reference to FIGS. 1 and 2. Preferably, the process 300 regularly and periodically executes during vehicle operation that includes activation of one or more of the autonomic vehicle control systems. By way of a non-limiting example, the process 300 preferably executes when the adaptive cruise control system is operative. In one embodiment, some or all of the steps of the process 300 may be executed in the remote server 220. Table 1 is provided as a key wherein the numerically labeled blocks and the corresponding functions are set forth as follows, corresponding to the process 300.

TABLE 1

| BLOCK | BLOCK CONTENTS |
| --- | --- |
| 302 | Determine environmental conditions |
| 304 | Determine vehicle operating conditions |
| 306 | Determine operator conditions |
| 308 | Determine extra-vehicle conditions |

TABLE 1-continued

| BLOCK | BLOCK CONTENTS |
| --- | --- |
| 309 | Operator commands activation of an autonomic vehicle control system |
| 310 | Execute algorithm to determine confidence level related to operation of the autonomic vehicle control system |
| 312 | Determine confidence level related to operation of autonomic vehicle control system |
| 314 | Visually display confidence level |
| 316 | Determine whether operator is watching the visual display |
| 318 | Determine if escalation of operator notification is required |
| 320 | Determine preferred modality for operator notification |
| 330 | Determine preferred signal modulation and intensity for operator notification |
| 332 | Activate operator notification |

Execution of the process 300 may proceed as follows. The steps of the process 300 may be executed in any suitable order, and are not limited to the order described with reference to FIG. 3. During vehicle operation, the various on-vehicle controllers determine environmental conditions (302), determine vehicle operating conditions (304), determine operator conditions (306) and determine extra-vehicle conditions (308). The environmental conditions preferably include parameters related to road conditions, weather, time of day, incident light, traffic flow, and the like. The vehicle operating conditions preferably include parameters vehicle speed, load, and vehicle dynamic capabilities related to steering, acceleration, braking, processor loading, and the like. The operator conditions preferably include parameters related to operator point of gaze, hand location, posture, interaction with in-vehicle devices such as vehicle controls or infotainment systems, time on a task, drowsiness and the like. The extra-vehicle conditions preferably include parameters related to traffic conditions and others as gleaned from traffic cameras, infrastructure sensing systems and other monitoring systems that may be available via wireless and/or satellite communication systems. This may include an intelligent highway system. Preferably, the environmental conditions, vehicle operating conditions, operator conditions and extra-vehicle conditions are regularly monitored at all times during vehicle operation.

In response to an operator command to activate one of the autonomic vehicle control systems (309), an algorithm is executed to determine a confidence level related to operation of the autonomic vehicle control system (310). A confidence level related to operation of the autonomic vehicle control system is an indication, preferably in the form of a numerical value that conveys a measure of certainty or uncertainty related to continued operation of the autonomic vehicle control system due to parameters related to the environmental conditions, vehicle operating conditions, operator conditions and extra-vehicle conditions. In one embodiment, the confidence level is determined based upon a statistical probability related to continued operation of the autonomic vehicle control system that takes into consideration parameters related to the environmental conditions, vehicle operating conditions, operator conditions and extra-vehicle conditions. In one embodiment, the confidence level has a numerical value that is continuously variable over a range between 0% and 100%. By way of a non-limiting example, a confidence level for operating the ACC 126 may have a relatively large value under conditions that include vehicle operation on a limited access highway in daylight hours with minimal traffic and dry weather. In contrast, the confidence level for operating the ACC 126 may decrease in value as any one or all of the aforementioned conditions change, such as vehicle operation on surface streets, or vehicle operation after dark, or vehicle operation with increasing traffic density, or vehicle operation with wet, foggy or snowy weather. The confidence level indicates to the operator the advisability of continuing or, alternatively, discontinuing operation of the autonomic vehicle control system. In one embodiment, the confidence level calculation is based at least in part upon a confidence level that is an aggregate of multiple operators, e.g., from a cloud computing source. In one embodiment, the confidence level is determined using a predictive model based on roadway context and history.

The confidence level related to operation of the autonomic vehicle control system (312) is preferably visually displayed via the controllable multi-color light bar 106 on the steering wheel 108, shown with reference to FIG. 2, the LCD device 133, the HUD, or another suitable visual display system. When the confidence level related to operation of the autonomic vehicle control system (312) is visually displayed via the controllable multi-color light bar 106 on the steering wheel 108, it may include, in one embodiment, displaying a bright green color on the light bar 106 when the confidence level is high, and replacing the green color with a yellow color as the confidence level decreases, and replacing the yellow color with a red color when the confidence level is at a level that indicates a need for immediate attention and intervention by the vehicle operator (314).

The controller determines whether the operator has observed the visual display indicating the confidence level (316), such as may be determined from the devices that monitor biometric data that communicate with the HMI controller 124. The controller also determines whether there is a need to escalate operator notification. A need to escalate the operator notification may be due to a change in the confidence level or a change in state of one or more of the operator conditions related to operator point of gaze, hand location, posture, interaction with in-vehicle devices such as vehicle controls or infotainment systems, time on a task, drowsiness and the like (318).

When there is a need to escalate the operator notification, a preferred modality for the operator notification is selected (320). This preferably includes selecting one or more of the operator interface devices that are capable of transmitting or otherwise conveying the confidence level to the operator, e.g., the audio feedback device 132, the wearable device 131, the haptic seat 130 and the LCD device 133, the HUD, or another suitable visual display system. Conveying the confidence level to the operator may include urging operator action, if so indicated. A preferred signal, preferred signal modulation and intensity are selected to transmit the confidence level and thus urge operator action in response to the confidence level (330), and such notification is activated (332). The preferred modality(ies) for operator notification, i.e., audio feedback device 132, the wearable device 131, the haptic seat 130 and the LCD device 133, the HUD may be preselected, or may be learned based upon in-use responses. In one embodiment, the operator notification of the confidence level may be displayed on a separate device, such as the hand-held cell phone or tablet 19A.

The process 300 is depicted as a flow chart illustrating an example method of a vehicle computing system receiving instructions from a one or more controllers in communication with the system. The vehicle computing system communicating with the one or more controllers may be implemented through a computer algorithm, machine executable code, non-transitory computer-readable medium, or software instructions programmed into a suitable programmable logic device(s) of the vehicle, such as the one or more controllers, an infotainment module, the remote server 200 that is in communication with the vehicle computing system, a mobile device such as the hand-held cell phone or tablet 19A that is communicating with the vehicle computing system and/or server, another controller in the vehicle, or a combination thereof. Although the various steps shown in the flowchart diagram may appear to occur in a chronological sequence, at least some of the steps may occur in a different order, and some steps may be performed concurrently or not at all.

This concept provides an analog-type indication to the operator of the system operating margin or quality of the system's automatic driving capability. This may include transmitting information to the operator about changes in the capability or level of system performance in response to varying road and weather conditions via the confidence level. The operator may be effectively informed as to how the autonomic vehicle control system performs in response to different operating conditions. This permits the operator to anticipate and adjust their attention while using an autonomic vehicle control system so they have more comfort and assurance that the system is performing as intended or expected. This may improve operator confidence and encourage greater operator attention, and permit the operator to respond appropriately to any notification related to the confidence level.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for operating a vehicle including with an autonomic vehicle control system, comprising:
during operation of the autonomic vehicle control system:
determining vehicle and environmental operating conditions,
determining extra-vehicle conditions,
determining a confidence level associated with the operation of the autonomic vehicle control system based upon the vehicle operating conditions, the environmental operating conditions and the extra-vehicle conditions,
transmitting, via an operator interface device, the confidence level associated with the operation of the autonomic vehicle control system, including visually displaying the confidence level via a controllable multi-color light bar that is disposed on a steering wheel, wherein transmitting the confidence level associated with the operation of the autonomic vehicle control system includes displaying a green color via the light bar when the confidence level is high, and displaying a red color via the light bar when the confidence level indicates a need for an immediate intervention by a vehicle operator;
monitoring the confidence level, and
transmitting the confidence level via a second operator interface device in response to a change in the confidence level.

2. The method of claim 1, wherein the confidence level has a numerical value that is continuously variable over a range between 0% and 100%.

3. The method of claim 1, wherein transmitting the confidence level via an operator interface device further comprises visually displaying the confidence level via an electronic visual display module.

4. The method of claim 1, wherein transmitting the confidence level via an operator interface device further comprises visually displaying the confidence level via a heads-up display.

5. The method of claim 1, wherein transmitting the confidence level via an operator interface device further comprises conveying the confidence level via an audio feedback device.

6. The method of claim 1, wherein transmitting the confidence level via an operator interface device further comprises conveying the confidence level via a haptic seat.

7. The method of claim 1, wherein transmitting the confidence level via an operator interface device further comprises conveying the confidence level via a wearable device.

8. A method for operating a vehicle including with an autonomic vehicle control system, comprising:
during operation of the autonomic vehicle control system:
determining vehicle and environmental operating conditions,
determining extra-vehicle conditions,
determining a confidence level associated with the operation of the autonomic vehicle control system based upon the vehicle operating conditions, the environmental operating conditions and the extra-vehicle conditions,
transmitting, via an operator interface device, the confidence level associated with the operation of the autonomic vehicle control system;
monitoring the confidence level,
monitoring biometric data associated with a vehicle operator,
determining a need to escalate notification to the vehicle operator based upon the biometric data;
transmitting the confidence level via a second operator interface device in response to a change in the confidence level; and
transmitting the confidence level via the second operator interface device when the need to escalate notification to the vehicle operator is determined based upon the biometric data.

9. A vehicle, comprising:
a steering wheel;
an autonomic vehicle control system;
a human-machine interface (HMI) controller;
a plurality of operator interface devices, wherein the operator interface devices are capable of transmitting a message associated with operation of the autonomic vehicle control system, wherein one of the operator interface devices comprises a controllable multi-color light bar that is disposed on the steering wheel, including the light bar being configured to display a first color when the confidence level is high, and the light bar being configured to display a second color when the confidence level indicates a need for an immediate intervention by the vehicle operator;
a controller including an instruction set, the instruction set executable to:
determine vehicle and environmental operating conditions and extra-vehicle conditions during operation of the autonomic vehicle control system,
determine a confidence level associated with the operation of the autonomic vehicle control system based upon the vehicle and environmental operating conditions and the extra-vehicle conditions, and
display, via the multi-color light bar, the confidence level associated with the operation of the autonomic vehicle control system.

10. The vehicle of claim 9, wherein the confidence level has a numerical value that is continuously variable over a range between 0% and 100%.

11. The vehicle of claim 9, wherein the operator interface devices further comprise an electronic visual display module.

12. The vehicle of claim 9, wherein the operator interface devices further comprise a heads-up display.

13. The vehicle of claim 9, wherein the operator interface devices further comprise an audio feedback device.

14. The vehicle of claim 9, wherein the operator interface devices further comprise a haptic seat.

15. The vehicle of claim 9, wherein the operator interface devices further comprise a wearable device.

16. A vehicle, comprising:
an autonomic vehicle control system;
a human-machine interface (HMI) controller;
a plurality of operator interface devices, wherein the operator interface devices are capable of transmitting a message associated with operation of the autonomic vehicle control system, wherein the operator interface devices includes a multi-color light bar;
a controller including an instruction set, the instruction set executable to:
determine vehicle and environmental operating conditions and extra-vehicle conditions during operation of the autonomic vehicle control system,
determine a confidence level associated with the operation of the autonomic vehicle control system based upon the vehicle and environmental operating conditions and the extra-vehicle conditions,
transmit, via the multi-color light bar, the confidence level associated with the operation of the autonomic vehicle control system,
monitor the confidence level,
transmit the confidence level via a second of the operator interface devices in response to a change in the confidence level,
monitor biometric data associated with a vehicle operator,
determine a need to escalate notification to the vehicle operator based upon the biometric data; and
transmit the confidence level via the second of the operator interface devices when the need to escalate notification to the vehicle operator is determined based upon the biometric data.

* * * * *